United States Patent
Dickinson et al.

[11] 3,897,988
[45] Aug. 5, 1975

[54] BEARING FOR A CONVEYOR ROLL OR THE LIKE

[75] Inventors: Thorn W. Dickinson, Kensington; Roger W. Parkinson, Plainville, both of Conn.

[73] Assignee: Textron Inc., Providence, R.I.

[22] Filed: Feb. 22, 1974

[21] Appl. No.: 444,962

[52] U.S. Cl. .................. 308/189 R; 308/195
[51] Int. Cl. .................. F16c 33/64; F16c 33/66
[58] Field of Search ........ 308/189 R, 193, 195, 201, 308/236

[56] References Cited
UNITED STATES PATENTS

| 822,723 | 6/1906 | Conrad | 308/195 |
|---|---|---|---|
| 2,005,502 | 6/1935 | Lontz | 308/189 R |
| 2,230,989 | 2/1941 | Barish | 308/189 R |
| 3,167,364 | 1/1965 | Dunn | 308/189 |
| 3,230,022 | 1/1966 | Znamirowski | 308/195 |
| 3,782,794 | 1/1974 | Chmura et al. | 308/193 |

*Primary Examiner*—Lloyd L. King
*Attorney, Agent, or Firm*—Hopgood, Calimafde, Kalil, Blaustein & Lieberman

[57] ABSTRACT

The invention contemplates a ball-bearing construction so devised as to insertably accept a selected flange bushing which performs the dual purpose of (1) adapting the bearing to a given desired bore size and contour and (2) substantially closing one axial end of the bearing. The other axial end of the bearing is substantially closed by a retainer having snap-engagement with the balls of the bearing. The particular disclosed construction also incorporates features favoring automated assembly.

16 Claims, 2 Drawing Figures

BEARING FOR A CONVEYOR ROLL OR THE LIKE

The invention relates to the construction of an antifriction bearing for a conveyor roll or the like.

It is an object of the invention to provide an improved construction of the character indicated.

Another object is to provide an antifriction-bearing construction lending itself with relative ease to selective application in mounting upon one of a variety of shaft sizes and contours.

A further object is to achieve the foregoing objects with a construction having an inherent additional bearing-shield function.

A specific object is to meet the above objects in a flanged conveyor-roll construction with a labyrinth-shield feature at the flanged end of the roll.

A general object is to provide a basically simple inherently inexpensive, and reliable construction of the character indicated.

Figure 1:
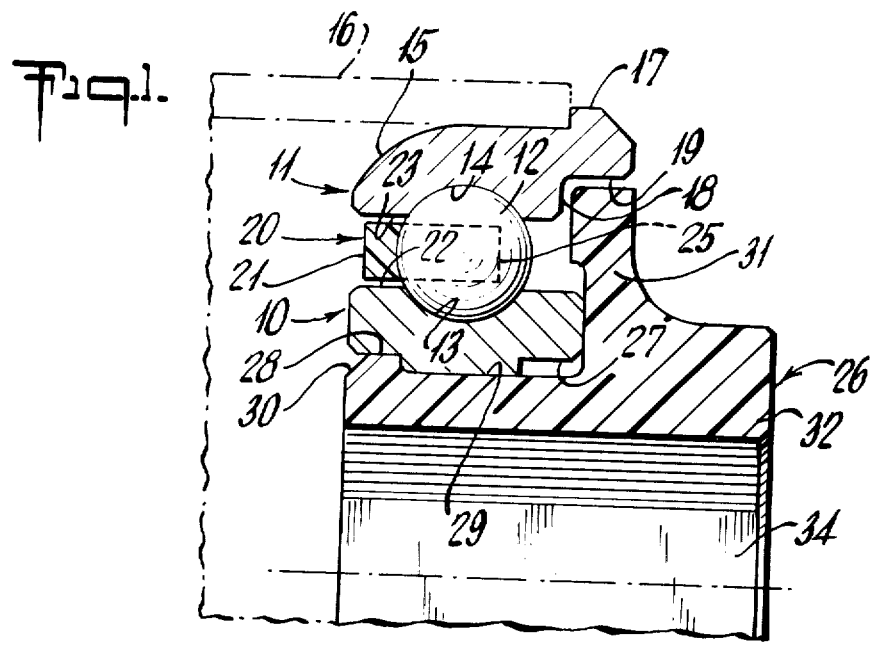
Figure 2:
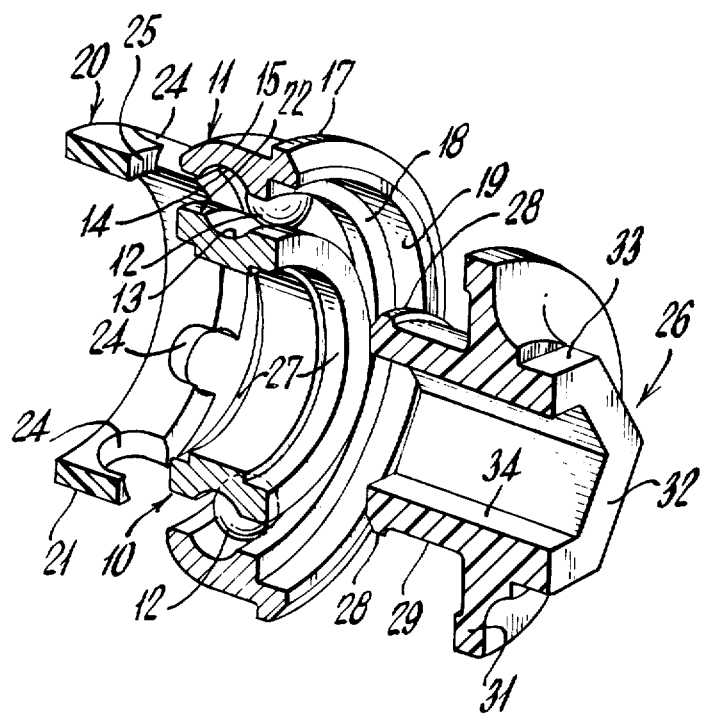

Other objects and various further features of novelty and invention will be pointed out or will occur to those skilled in the art from a reading of the following specification, in conjunction with the accompanying drawings. In said drawings, which show, for illustrative purposes only, a preferred form of the invention:

FIG. 1 is an enlarged, fragmentary view in longitudinal section through a conveyor roll incorporating features of the invention; and FIG. 2 is a fragmentary view of antifriction elements in exploded relation with respect to other elements of the structure of FIG. 1.

The invention is shown in application to a conveyor-roll bearing comprising inner and outer bearing rings 10–11 having a complement of spaced balls 12 riding opposed raceways 13–14. The external or roll surface 15 of ring 1 is slightly crowned, tapered or rounded at or in the direction of one axial end to facilitate assembly to a tubular member (suggested by phantom outline 16); a conveyor roller is thus assembled, with opposed bearing assemblies in the opposite ends of the bore of member 16, as will be understood. Insertion of surface 15 into member 16 is limited by a stop flange 17 forming part of the outer ring 11 and shown to characterize that portion of ring 11 which is offset axially beyond the corresponding axial end of the inner ring 10. At this offset portion, i.e., beneath flange 17, the inner surface of outer ring 11 is counterbored to define adjacent radial and axial surfaces 18–19 for establishing a labyrinthshield function, to be later more fully described.

The balls 12 are held in spaced relation by retainer means 20 which may be a single injection-molded piece of suitable plastic, having low-friction and good-memory properties, as for example Delrin or Zytel, being names of those employed by the DuPont Company for certain of their thermoplastic resins. Preferably, retainer means 20 has an annular body 21 which overlaps opposed lands 22–23 at the axially inner end of rings 10–11, i.e., the axial end opposite offset-flange end, and the clearance is relatively small to that body end 21 substantially closes the space between bearing rings at said inner axial end. Retainer 20 is characterized by plural spaced ball-receiving pockets 24 concaved to derive running support from balls 12 and extending axially past the radial plane of ball centers, to an open-pocket side 25, in order to permit axial retention of an assembled relationship. In this assembled relationship, the inner axial ends of rings 10-11 and retainer 20 are preferably in essentially a single radial plane, as shown, thus assuring greatest area of protection at clearances with lands 22–23.

In accordance with a feature of the invention, a single-piece flanged bushing 26, which may be one of a variety of sizes and configurations, is assembled to the bore of the inner ring 10, to perform multiple functions including (a) selection of bore contour for the completed assembly, (b) shielding by substantial closure of the remaining end space between bearing rings, and (c) elimination of metal-to-metal contact thereby reducing noise transmitted to the supporting frame (not shown). Bushing 26 may be a sintered-metal part or, preferably as shown, it may be injection-molded of the same material as used for retainer 20, preference being shown for the particular DuPont material known as Zytel 103. If made of sintered metal, bushing 26 would have force-fit assembly to the bore of inner ring 10, but for the plastic construction which is preferred for loads other than heavy-duty rating, we make use of the yieldable and memory properties of the plastic to assure axial retention by snap action of a deformable formation on the bushing. To provide for ease of bushing assembly to inner ring 10, one of two like counterbores 27 at the axial ends of inner ring 10 defines a retaining shoulder to receive and locate a radial projection, rib or flange 28 at the axially inner end of the cylindrical surface 29 of bushing 26. The surface 29 has close-fitting relation with the cylindrical inner-ring bore, between counterbores 27, and the projection 28 has an interference relation therewith; a chamfer or bevel 30 characterizes the interfering insertion edge of bushing 26 and serves to inwardly cam (i.e., to transiently inwardly deform) projection 28 as it is being axially assembled into the bore of the inner ring, resulting in retention by snap-action of projection 28 into the axially inner counterbore 27 when the flanged end 31 of the bushing abuts the axially outer end of ring 10, all as shown in FIG. 1.

Alternatively, the bushing 26 may be initially formed without projection 28 (i.e., surface 29 extending continuously to the axially inner end of bushing 26), and projection 28 may be formed after assembly to inner ring 10, as by employing a heated tool, under pressure, to displace bushing material into the retaining counterbore 27.

When thus assembled, the flange 31 extends into close-clearance relation with the counterbore surfaces 18–19, thus establishing a labyrinth-shield passage involving a radial portion adjacent surface 18 and an adjacent axial portion along surface 19; also, that outer portion of flange 31 which is adjacent the outer-ring offset flange 17, is fully contained within the offset, presenting a flush, substantially radial-plane conformance of adjacent axial-end portions of the outer ring 11 and flange 31. Still further, when thus assembled, the axially inner end of bushing 26 is preferably flush with (i.e., in essentially the same radial plane as) the corresponding end of inner ring 10, as shown.

As a further feature, for manipulative purposes during assembly, the bushing 26 integrally includes an axially outwardly projecting central hub portion 32 with external wrench-flat formations 33, shown hexagonal in FIG. 2.

For certain conveyor-roll applications it is desired that the inner rings be essentially non-rotating. To this end, the bore 34 of bushing 26 is shown characterized by a regular-polygon section, sized for the particular desired fixed mounting-shaft section.

The invention will be seen to have achieved all stated objects and, in the event of using plastic as preferred for the parts 20–26, to provide for substantial noise reduction by eliminating or reducing metal-to-metal contact; the use of plastic for bushing 26 also avoids the fretting corrosion which might be encountered if the bushing were of metal. Economies are achieved by eliminating costly turning, reaming and broaching operations, and by reduction in the number of parts, as compared to prior constructions.

The invention will be understood to be subject to some modification from the specific disclosed form shown, without departing from the claimed scope. For example, by plating, spraying, vacuum-metalizing or otherwise coating a plastic bushing 26 with an electrically conductive exterior, the bushing 26 provides a direct path of discharge to the frame (ground) for electrostatic voltages which may develop during use of the roll surface 16.

What is claimed is:

1. Antifriction-bearing means, comprising inner and outer race rings with plural bearing balls riding the races of said rings and radially spacing said rings, an annular retainer substantially closing the space between said rings on one axial side of said balls, said retainer having plural ball-receiving pockets and being engaged to and retained by said balls in said pockets, and a flanged bushing engaged to the bore of the inner race ring upon insertion from the axial side opposite said one axial side, the flange of said bushing being axially adjacent said opposite axial end of the inner race ring and extending radially outwardly thereof in the direction of said outer race ring to substantially close the space between said bearing rings on the said opposite axial side of said balls.

2. Antifriction-bearing means according to claim 1, in which said bushing is a single injection-molded plastic article having a deformable retaining projection at the end opposite said flanged end, said retaining projection interfering with the bore of the inner-race ring and therefore being transiently deformed upon insertion into said bore and regaining its undeformed condition to retain a bore-assembled relationship after passage through the bore.

3. Antifriction-bearing means according to claim 2, in which said deformable retaining projection is a radially outward flange.

4. Antifriction-bearing means according to claim 3, in which the bore of the inner race ring has a counterbore of effective axial extent substantially corresponding to the effective width of said deformable retaining flange.

5. Antifriction-bearing means according to claim 1, in which the opposite axial side of said outer race ring is offset further axially outwardly than said inner bearing ring, and in which adjacent portions of the flange of said bushing and of the axial end of said outer race ring are in substantially the same radial plane.

6. Antifriction-bearing means according to claim 1, in which a counterbore characterizes the bore of the outer race ring at the opposite axial end thereof, the flange of said bushing having mated close-clearance relation with said counterbore.

7. Antifriction-bearing means according to claim 1, in which the bore section of said bushing is a regular polygon.

8. Antifriction-bearing means according to claim 7, in which the bore section is hexagonal.

9. Antifriction-bearing means according to claim 1, in which the radially outer contour of said outer race ring is characterized by a radially outward flange at said opposite axial end, said bushing flange being accommodated in the space between said rings and in essentially axially overlapping register with said outer-ring flange.

10. A bearing construction for conveyor-roll assembly, comprising inner and outer race rings with plural bearing balls radially spacing and riding the races of said rings, corresponding first axial ends of said rings being in essentially a single radial plane and the opposite axial end of said outer ring being axially offset beyond the corresponding end of said inner ring, an annular retainer substantially closing the space between said rings at said first axial end and having axially open ball-receiving pockets engaged to and retained by said balls, and a flanged bushing engaged to the bore of the inner bearing ring upon insertion from the axial end opposite said first axial end, the flange of said bushing being axially adjacent said opposite axial end of the inner race ring and extending radially outwardly thereof in the direction of said outer race ring and beneath the axial-end offset of said outer race ring.

11. The conveyor-roll construction of claim 10, in which the first axial ends of said retainer and bushing are in substantially the same radial plane as the first axial ends of said race rings.

12. The conveyor-roll construction of claim 10, in which the outer surface of said outer race ring is outwardly flanged at the axial-end offset portion of said outer race ring.

13. Antifriction-bearing means, comprising inner and outer race rings with plural bearing balls riding the races of said rings and radially spacing said rings, an annular retainer having plural ball-receiving pockets and being engaged to and retained by said balls in said pockets, and a flanged bushing engaged to the bore of the inner race ring upon insertion from the axial side opposite said one axial side, the flange of said bushing being axially adjacent said opposite axial end of the inner race ring and extending radially outwardly thereof in the direction of said outer race ring to substantially close the space between said bearing rings on the said opposite axial side of said balls.

14. Antifriction-bearing means, comprising inner and outer race rings with plural bearing balls riding the races of said rings and radially spacing said rings, and a flanged bushing having a mounting bore and engaged to the bore of the inner race ring upon insertion from one axial end, the flange of said bushing being axially adjacent said axial end of the inner race ring and extending radially outwardly thereof in the direction of and into proximity with said outer race ring to substantially close the space between said bearing rings at said one axial end.

15. Antifriction bearing means according to claim 14, in which said flanged bushing is a single injection molded plastic article.

16. Antifriction bearing means according to claim 15, in which said plastic article has a conductive coating.

* * * * *